United States Patent
Rodden et al.

(10) Patent No.: US 6,205,378 B1
(45) Date of Patent: Mar. 20, 2001

(54) ADAPTIVE MASS EXPULSION ATTITUDE CONTROL SYSTEM

(75) Inventors: John J. Rodden, Los Altos; Homer D. Stevens, Redwood City; Stephane Carrou, Menlo Park, all of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/363,680

(22) Filed: Jul. 29, 1999

(51) Int. Cl.$^7$ ..................................................... G06F 17/00
(52) U.S. Cl. ........................................ 701/13; 701/3; 701/4; 701/123; 701/226; 342/350; 342/355; 60/200.1; 60/201; 60/204; 244/3.21; 244/158 R; 244/164; 244/169; 244/172
(58) Field of Search .................................. 701/3, 4, 5, 13, 701/123, 226; 244/3.1, 3.21, 158 R, 164, 168, 169, 171, 172; 342/46, 62, 350, 352, 355; 60/200.1, 201; 434/34

(56) References Cited

U.S. PATENT DOCUMENTS 3,624,367 * 11/1971 Hamilton et al. ...................... 701/13
5,282,357 * 2/1994 Sackheim .............................. 60/204

* cited by examiner

Primary Examiner—William A. Cuchlinski, Jr.
Assistant Examiner—Yonel Beaulieu
(74) Attorney, Agent, or Firm—Perman & Green LLP

(57) ABSTRACT

An attitude control system and method operative with a thruster controls the attitude of a vehicle carrying the thruster, wherein the thruster has a valve enabling the formation of pulses of expelled gas from a source of compressed gas. Data of the attitude of the vehicle is gathered, wherein the vehicle is located within a force field tending to orient the vehicle in a first attitude different from a desired attitude. The attitude data is evaluated to determine a pattern of values of attitude of the vehicle in response to the gas pulses of the thruster and in response to the force field. The system and the method maintain the attitude within a predetermined band of values of attitude which includes the desired attitude. Computation circuitry establishes an optimal duration of each of the gas pulses based on the pattern of values of attitude, the optimal duration providing for a minimal number of opening and closure operations of the valve. The thruster is operated to provide gas pulses having the optimal duration.

10 Claims, 15 Drawing Sheets

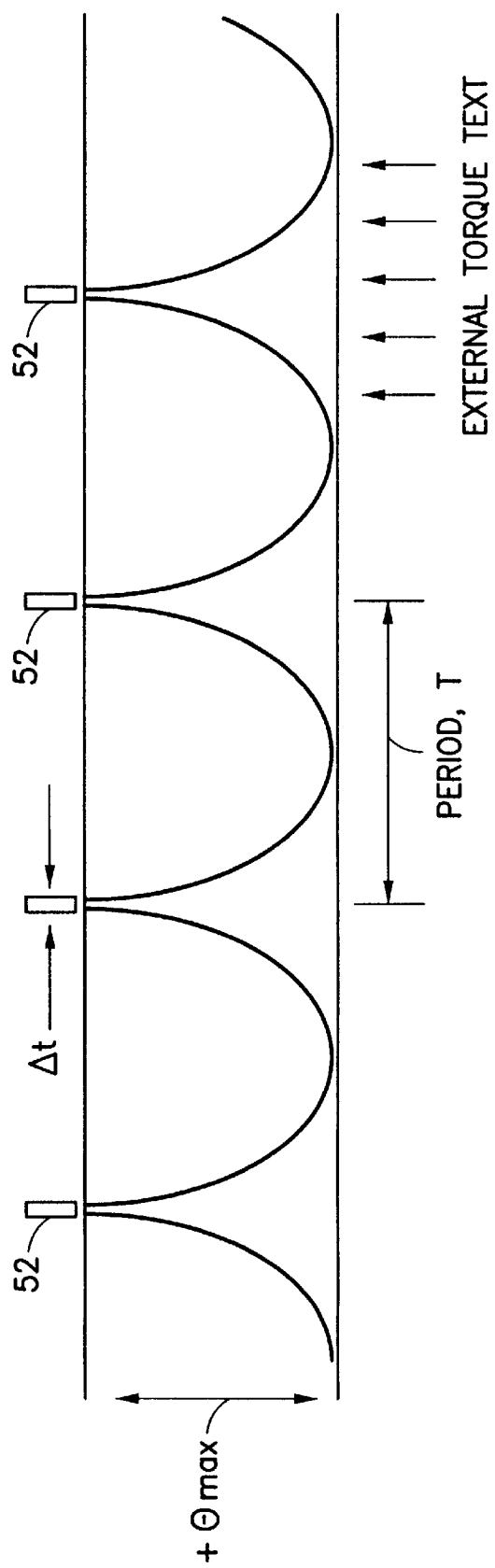
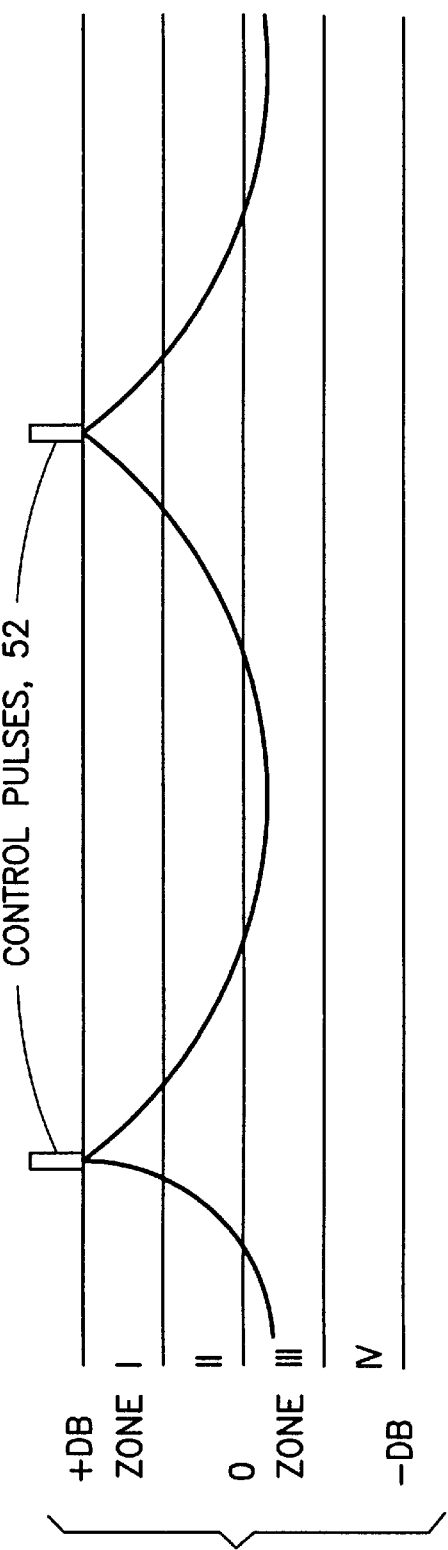

ADAPTIVE MASS EXPULSION ATTITUDE CONTROL SYSTEM

This work is done under NASA Contract Number NAS7-1260. The invention was made with government support and the government has certain rights in the invention.

BACKGROUND OF THE INVENTION

This invention relates to a system for controlling the attitude of a vehicle, particularly a spacecraft, wherein the system employs thrusters operative by an on/off control process to obtain pulsed mass expulsion and, more particularly, to pulsed mass expulsion with adaptive pulse width modulation to minimize a frequency of pulsation.

In the employment of spacecraft in a mission, such as the encirclement of the earth by a communications or scientific satellite, it is necessary to stabilize the attitude of the spacecraft. The stabilization is accomplished by overcoming the destabilizing torques of sources of disturbance to the stabilization of the spacecraft. Sources of destabilizing torque include aerodynamic torques experienced by spacecraft travel in a low orbital path through residual atmosphere, solar torque caused by pressure from the sun, and torque induced by gravity gradient from the earth's gravitational field.

The attitude control system may employ thrusters which, upon activation, develop forces and moments which push the spacecraft back to the desired attitude. A thruster may be constructed to expel mass, such as ionized particles accelerated by an electrostatic field, or molecules of gas expelled from a canister of pressurized gas. In addition, a control system employed for attitude stabilization may employ magnetic forces, as by use of magnetic torquers. The magnetic torquers comprise rods of magnetic material encircled by coils excited with electric current provided by photocells onboard the spacecraft, wherein the magnetic forces of the coils interact with a relatively weak magnetic field of the earth. The interaction of these magnetic forces develops a torque which tends to aid in the attitude stabilization.

However, the magnetic forces are unable, both in terms of magnitude and direction, to overcome the net destabilizing torque of one or more of the foregoing sources of destabilizing torque and, therefore, are useful only in reducing the rate of drift of the spacecraft away from the desired attitude. With respect to the direction of the magnetic forces developed by the magnetic torque rods, it is noted that such forces are available only in two directions, both of which are orthogonal to the earth's magnetic field, while the development of forces in three dimensions, such as the forces of an array of thrusters, is required to stabilize the spacecraft.

Of particular interest herein is the employment of the thruster which operates by expelling gas in the form of pulses of the gas. In such a thruster, the gas is contained compressed in a canister, and the canister of compressed gas communicates via a solenoid-operated valve to an exterior nozzle through which the expelled molecules of gas are directed into the environment outside the spacecraft. Use of the solenoid to open the valve during the time interval of the resulting jet, followed by a closing of the valve to terminate the jet of compressed gas, provides the desired impulse of the expelled gas.

Generally, in a control system, the pulses of the expelled gas have a fixed predetermined duration. The repetition frequency of the pulses is sufficiently low such that information obtained from attitude sensors onboard a spacecraft can be employed to monitor and predict the progress in correction of the spacecraft attitude. Thereby, the pulses of expelled gas can be generated as needed for correction and/or stabilization of the spacecraft attitude.

It has been found that a spacecraft stores sufficient gas for operation of the thrusters during a period of years which constitute the mission of the spacecraft. However, such a thruster experiences a problem in that the use of the valve, with its numerous openings and closings, produces a degradation of the valve seat and/or is mating element with a consequent impairment of the operation of the thruster. Even though a valve may be designed, possibly for a million operations, the duration of the spacecraft mission may have to be curtailed because the valve has exceeded its design lifetime in terms of the number of openings and closures.

SUMMARY OF THE INVENTION

The aforementioned problems are overcome and other advantages are provided by an attitude control system employing a plurality of gas jet thrusters wherein, in accordance with the invention, the duration of pulses of the expelled gas is varied to provide a desired value of impulse while obtaining a minimization of the number of opening and closing operations of the valves of the respective thrusters. In accordance with a feature of the invention, the attitude control system monitors a pattern of drift of the spacecraft attitude about a desired attitude and within an acceptable band of attitude error. This enables the system to determine the magnitude of the impulse required to alter the momentum of the spacecraft, and to urge the spacecraft back towards the desired attitude. The invention provides for both modulation of the duration of a thruster pulse as well as for a variation in repetition frequency of the thruster pulsing. The thrusters are activated in the situations wherein the spacecraft attitude is outside the acceptable band, or is within the acceptable band but is in imminent danger of moving out of the acceptable band.

In accordance with a feature of the invention, the thrusters are not activated in the situation wherein the attitude of the spacecraft is well within the band of acceptable attitude, and is not in imminent danger of moving outside the band of acceptable attitude. Accordingly, for convenience in description, the acceptable band of attitude may be referred to as the dead band. In view of the need for corrective action even in the situation wherein the attitude is in a central region of the dead band but is drifting rapidly away from the desired attitude, the control system of the invention is responsive both to the angular orientation of the spacecraft as well as to the angular velocity, or angular momentum, of the spacecraft. Correspondingly, the system error, in terms of use of the dead band, is a combination of both the angular orientation and the angular velocity of the spacecraft.

The invention provides for two modes of operation of the attitude control system, one mode being preferred in the situation wherein the attitude correction is obtained by use of the gas jet thrusters without augmentation of the magnetic torque rods, and the second mode being preferred in the situation wherein the attitude correction is obtained by use of the magnetic torque rods in conjunction with the gas jet thrusters.

In the first mode of operation, a gas jet having a nominal value of impulse is employed to deflect the spacecraft attitude away from a first edge of the dead band in a direction towards the opposite edge of the dead band. A plot of the attitude error shows, subsequent to the impulse, a diminution in the attitude error and, later, a drifting back towards the first edge of the dead band. The thruster is operated again to deflect the spacecraft attitude away from the first edge of the dead band. A plot of the attitude error then shows a repetitive and predictable pattern. The longest duration pulses, which correspond with the minimum number of opening and closure operations of the valve, are selected to drive the spacecraft attitude from the first edge toward the opposite edge of the dead band without over-stepping the opposite edge. The determination of the requisite duration of a pulse of the gas jet is based on the repetition period in the plot of the attitude error.

In the second mode of operation, the presence of the magnetic torque introduces a somewhat random appearance to the aforementioned plot of the attitude error. As a result, the pattern is not predictable in an accurate fashion and, as a result, the periodicity of the plot is not available for the determination of the optimal duration of a pulse of the gas jet. Accordingly, in the second mode of operation, the plot is observed to determine the displacement of the attitude error as measured between the opposite edge of the dead band and the closest point of approach of the plot to the opposite edge of the error band. The determination of the requisite duration a pulse of the gas jet is based on production of a minimal value of approach of attitude error to the opposite edge of the error band without over-stepping the opposite edge of the error band. This provides for the minimum number of closing and opening operations of the thruster valve.

BRIEF DESCRIPTION OF THE DRAWING

The aforementioned aspects and other features of the invention are explained in the following description, taken in connection with the accompanying drawing figures wherein:

FIG. 2 is a graph of the attitude of the spacecraft of FIG. 1 in the case wherein correction of attitude is made only by the use of gas thrusters;

FIG. 3 is a graph of the attitude of the spacecraft of FIG. 2 in the case wherein correction of attitude is made by use of gas thrusters and magnetic torquers;

Identically labeled elements appearing in different ones of the figures refer to the same element but may not be referenced in the description for all figures.

DETAILED DESCRIPTION OF THE INVENTION

Figure 1:
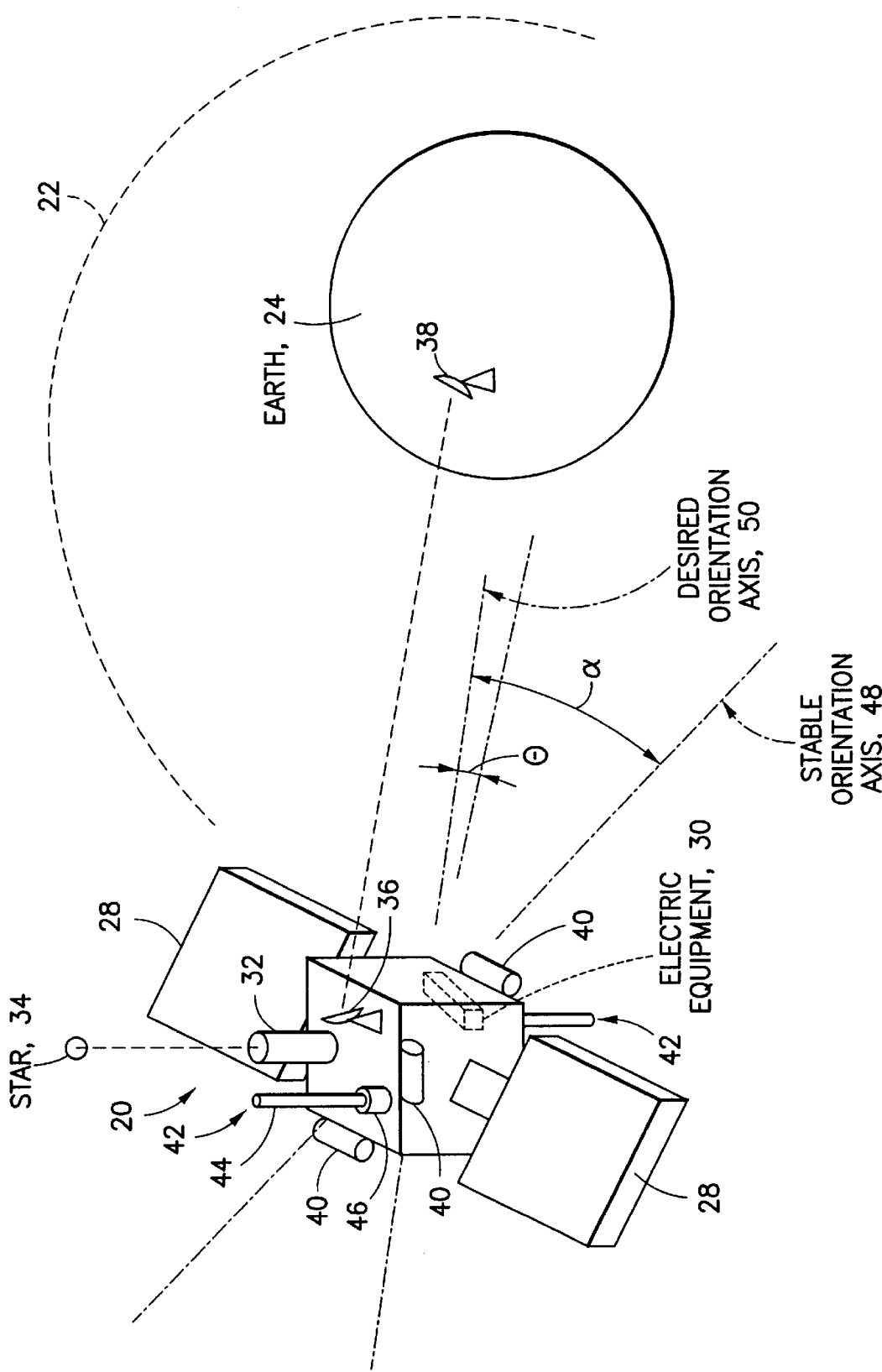
FIG. 1 is a stylized view of a vehicle, shown as a spacecraft, having an attitude which is controlled in accordance with the invention.

FIG. 1 shows a spacecraft 20 traveling on an orbit 22 around the earth 24. The spacecraft 20 includes a body 26 which carries solar panels 28 for conversion of solar energy to electrical energy for powering electronic equipment 30 also carried within the body 26. A star tracker 32 is disposed on the body 26 and is oriented towards a star 34. In the situation wherein the spacecraft 20 is serving a mission of a communications satellite, communication antennas, one such antenna being shown at 36, are positioned on the body 26 and directed toward the earth 24 for communication with ground-based stations, one such station being shown at 38. Compressed gas thrusters 40 are mounted in various locations about the body 26, three of the thrusters 40 being shown by way of example. The thrusters 40 serve for orienting the spacecraft 20 in a desired attitude. Magnetic torquers 42 may also be carried onboard the spacecraft 20, and are mounted at various locations upon the body 26, two such torquers 42 being shown by way of example. In the schematic representation of the torquers 42, a torquer 42 is shown as comprising a rod 44 of magnetic material with a coil 46 encircling the rod 44 to excite therein a magnetic field. The magnetic fields of the torquers 42 interact with the earth's magnetic field to develop a torque for orienting the spacecraft 20 in a desired attitude.

Also shown in FIG. 1 are two axes 48 and 50 separated by an angle $\alpha$. The axis 48 shows a stable attitude of the spacecraft 20, and the axis 50 shows a desired attitude of the spacecraft 20. For simplicity, the figure shows only a two dimensional representation of the spacecraft attitude, it being understood that the invention is operative to correct attitude in terms of three dimensions. For example, a gravitational field may induce spacecraft motion in one plane and solar pressure may induce spacecraft motion in another plane. As shown in the figure, the spacecraft 20 has the desired attitude and, accordingly, the axis 50 is directed from the spacecraft 20 towards the earth 24. In the event that the thrusters 40 and torquers 42 are not activated, the interaction of the earth's gravity with the distribution of mass in the spacecraft 20 causes the spacecraft 20 to drift to the attitude of the stable orientation, in which case the axis 48 would be directed towards the earth 24. Also shown is an angle $\Theta$ which represents an angular deviation in the attitude of the spacecraft 20 from the desired orientation. The maximum value of the angle $\Theta$ represents an edge of an angular band of acceptable spacecraft attitude, namely the dead band, about the desired orientation axis 50.

In accordance with an aspect of the invention, it is recognized that some drifting of the spacecraft attitude about the axis 50 may be allowed to occur prior to activation of a thruster to correct the error in attitude. For example, if the spacecraft attitude lies substantially centered within the dead band, it may not be necessary to activate a thruster. Also, in accordance with the invention, it is recognized that excessive activation of a thruster may drive the spacecraft attitude outside of the dead band Generally, the magnetic torquers 42 may be activated to counteract a continuous drift of the spacecraft attitude away from the axis 50, with the gas thrusters 40 being employed when the attitude error and/or rate of drift becomes excessive. The pattern of attitude drift, including both orientation and velocity, within the dead band is employed by the invention to operate the gas thrusters 40 in a manner which minimizes the number of opening and closing operations of a valve of a gas thruster 40, these operations forming, respectively, the leading and the trailing edges of the pulses of expelled gas. Accordingly, it is advantageous to study the pattern of attitude change within the dead band.

FIGS. 2 and 3 present graphs showing error functions describing angular drift in attitude of the spacecraft 20 within the dead band. In each of the graphs, the angle Θ as shown on the vertical axis and the time of drift in shown on the horizontal axis. The graph of FIG. 2 shows the situation wherein only the compressed gas thrusters 40 are employed for correction of spacecraft attitude. The graph of FIG. 3 shows the situation wherein both the gas thrusters 40 and the magnetic torquers 42 are employed for correction of spacecraft attitude. Both of the graphs have generally the appearance of a scallop. In FIG. 2, it is noted that the graph has a regular periodicity with a period indicated as T. In FIG. 3, the graph has a somewhat irregular shape due to the activation of both kinds of the thrusters 40 and torquers 42. In both of FIGS. 2 and 3, the generation of a gas pulse is indicated at 52. The duration of the pulse is indicated by Δt. Also indicated in FIG. 2 is the direction of the external torque (Text) from the earth's gravitational field which tends to rotate the spacecraft 20 away from the desired attitude.

For purposes of illustration, the external torque is shown on one side of the dead band (the bottom edge in FIG. 2 as well in FIG. 3) for driving the spacecraft attitude across the band in the direction of the gravitational field, which direction may be referred to as downstream for ease of reference. Also, for purposes of illustration, the gas pulses 52 are shown on the opposite side (the top edge in FIG. 2 as well as in FIG. 3) of the dead band for driving the spacecraft attitude across the band in a second direction opposite to the downstream direction, wherein the second direction may be referred to as the upstream direction for ease of reference.

In FIG. 2, each gas pulse 52 exerts a force on the spacecraft over an interval of time producing a force impulse equal to the integral of the product of the force times the time. This imparts an angular momentum to the spacecraft with an angular velocity that directs the spacecraft back towards the bottom edge of the dead band. Subsequent to the thruster pulse, the retarding external torque of the earth's magnetic field slows down the angular velocity of the spacecraft to a value of zero velocity in the vicinity of the bottom edge of the dead band. The retarding torque continues then to alter the direction of the spacecraft drift to bring the spacecraft attitude with increasing angular velocity back towards the top edge of the dead band. Similar comments apply to the graph of FIG. 3, wherein, if desired, the dead band may be divided into four zones, and error measured from the center of the band may be represented in decibels.

The duration of a pulse 52 of the gas is very much smaller than the periodicity of the graph in FIG. 2 so that, for purposes of illustration, the change in momentum and angular velocity may be shown as virtually instantaneous. A suitable control system for operation of the thrusters will be described below with reference to FIG. 4, wherein the system provides for a sampling of the error function at a rate preferably of once per second, though other rates may be used if desired. Minimum duration of a gas pulse 52 is approximately 30 milliseconds, this being a lower limit based on the switching characteristics of the solenoid valve employed in the thruster 40. Pulses 52 of longer duration are employed to impart greater amounts of momentum to the spacecraft. This sampling rate is much faster than the dynamic response of the spacecraft to torques imparted by the earth's gravitational field and by the impulses of the thrusters.

In the acquisition phase, when the spacecraft 20 is first placed into orbit, or after a disruption which offsets its attitude, the attitude error exceeds the preset dead band threshold parameter. The procedure begins with generation of the minimum duration pulse at the beginning of a computation simple time. The thruster impulse duration is to increase monotonically for an error signal larger than the dead band limits according to a predetermined analytic function to a level of 100 percent duty cycle when the pulse duration is equal to the simple time. The system of the invention is operative to stabilize the spacecraft to within a few degrees of the reference sensor null in the acquisition phase.

Fine attitude control is established with a fine attitude sensor with of without an independent rate sensor. The star tracker 32 serves as a suitable fine attitude sensor, and may be operated with a sampled data output rate as low as once per second or even lower. The fine attitude control is able to stabilize the spacecraft to within a fraction of a milliradian (a few hundredths of a degree of arc) of attitude of the reference sensor null.

In accordance with a feature of the invention, it is recognized that, in the situation of FIG. 2, knowledge of the period of the graph can be employed for adjusting the impulse provided by the gas thruster to keep the spacecraft attitude within the dead band. The thruster is fired each time that the error reaches the upper edge of the dead band. In the event that the impulse provided by the thruster is insufficient to move the error function from the top edge to the bottom edge of the dead band, the error returns to the top edge in less time than that displayed in FIG. 2, in which case the deposition frequency is increased and the periodicity of the graph of FIG. 2 is decreased. The decrease in the length of the period is observed, and this information is employed to increase of the impulse of the thruster. In the event that the error function moves beyond the bottom edge of the dead band, the period of the graph is observed to be excessively long, and the control system responds by decreasing the impulse of the thruster. Measurement of the error function by the control system also serves to alert the system when the thruster impulse is excessive, this information being available also for establishing a maximum value of thruster impulse.

In the situation of FIG. 3, a knowledge of the maximum excursion in spacecraft attitude subsequent to a gas pulse 52 can be employed for adjusting the impulse provided by the gas thruster to keep the spacecraft attitude within the dead band. Therefore, the invention provides for two different modes of analysis of the graphs, namely a first mode for the spacecraft dynamics presented in the graph of FIG. 2 wherein the periodicity of the graph may be used to establish magnitude of desired thruster impulse, and a second mode for the spacecraft dynamics of FIG. 3 wherein a displacement of the error function from the bottom edge of the dead band is used to establish magnitude of desired thruster impulse. In both of the operational modes, the operating procedure begins with a minimum value of pulse width, which value is increased until the thruster provides the desired amount of impulse to attain the graph of FIG. 2 for the first mode, or the graph of FIG. 3 for the second mode.

Figure 4:
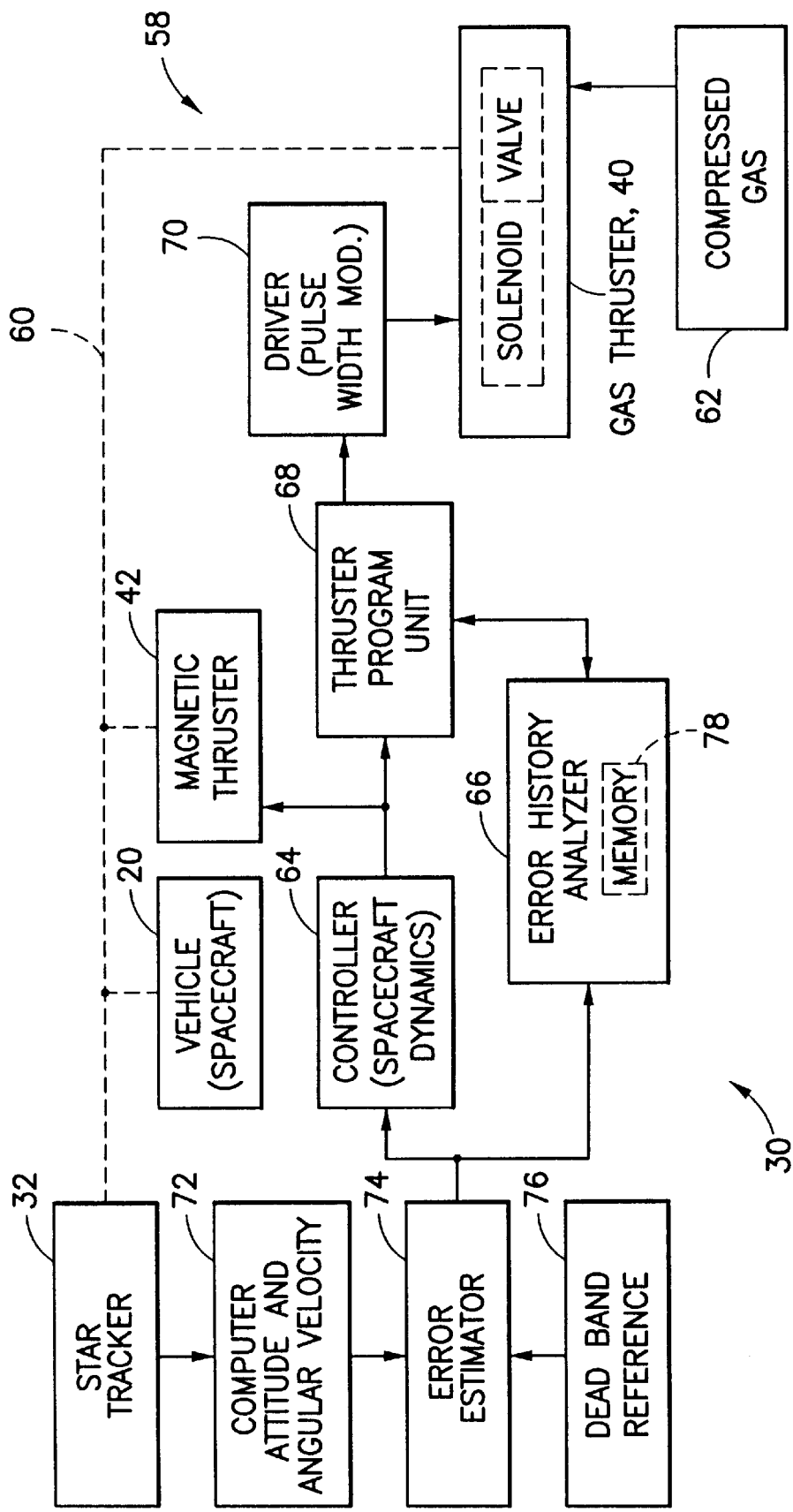
FIG. 4 is a block diagram showing schematically basic components of a control system of the invention, and the operation of the control system for controlling attitude of the spacecraft on FIG. 1.

FIG. 4 shows a generalized view of a system 58 which operates in accordance with the invention for control of the attitude of a vehicle, such as the spacecraft 20 of FIG. 1, the figure including also functional blocks for explaining operation of the system 58. Included in FIG. 4 is the star tracker 32, one of the gas thrusters 40 and one of the magnetic torquers 42 which are physically connected to spacecraft 20 as indicated by the dashed line 60. Also carried by the spacecraft 20 is a compressed gas container 62 which holds gas for use by the gas thruster 40. The remaining components in FIG. 4 are contained within the electronic equipment 30 shown in FIG. 1, these components including a controller 64, an error history analyzer 66, a thruster program unit 68, a driver 70, a computer 72 of spacecraft attitude and angular velocity, and an error estimator 74.

In the operation of the system 58, desired attitude is entered at block 76. Signals provided by the tracker 32 from the tracking of a star are inputted to the computer 72 for computation of the present state of the spacecraft 20, namely, the attitude and angular velocity of the spacecraft 20. The difference between the desired attitude at block 76 and the present state at computer 72 is computed at the error estimator 74. The difference is outputted by the estimator 74 to the controller 64 and also to the error history analyzer 66, the latter including a memory 78 storing data of spacecraft response to thruster activity. The controller 64, which may include filters and integrators (not shown in the figure, but to be described later), generates a command for activation of the thrusters 40 and torquers 42 to correct the attitude of the spacecraft 20. The command signal is applied directly to the magnetic torquer 42 to provide for a relatively small torque to the spacecraft 20, and is applied to the driver 70 of the thruster 40 via the program unit 68. The driver 70 includes a pulse width modulator for modulating the duration of the gas pulse emitted by the thruster 40. The program unit 68 also receives information from the analyzer 66. The program unit 68 serves to transform the command signal outputted by the controller 64 into a pulsing pattern for the gas thruster 40 which minimizes the number of operations of the solenoid valve of the thruster 40.

Figure 5:
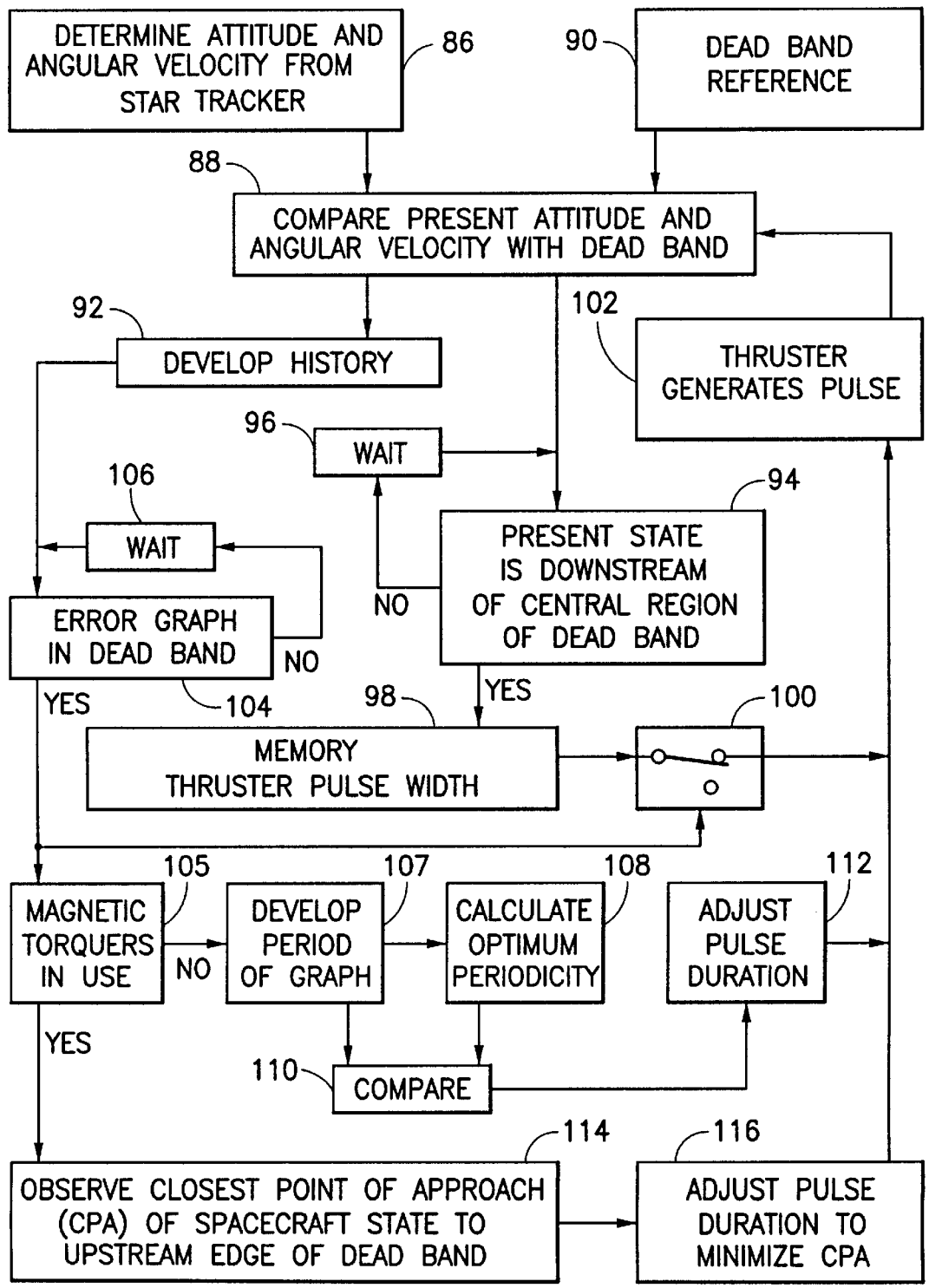
FIG. 5 is a flow chart showing operation of the control system of the of FIG. 4.

With reference to FIGS. 4 and 5, the operation of the system 58 of FIG. 4 may be explained with reference to the flowchart of FIG. 5. The description provided by the flowchart is directed to the novel features of the invention and include, particularly, the function provided by the error history analyzer 66 and the thruster program unit 68. The operation of the controller 64, described above, is omitted in the flowchart to facilitate an explanation of the operation, but is included in the beginning with FIG. 6. In FIG. 5, the flowchart begins with the initial steps in the operation, before the attitude and the angular velocity of the spacecraft have been established within the confines of the dead band. At block 86, there is a determination of the attitude and angular velocity of the vehicle, particularly the spacecraft 20 of FIG. 1, this determination being accomplished by use of the star tracker 32 and the computer 72 of FIG. 4. At block 88, there is a comparison between the present attitude and angular velocity with the desired attitude and angular velocity as provided by data of the dead band at block 90. The results of the comparison at block the 88 provide a system error in terms of three components of the spacecraft attitude and the angular velocity. By continuous observation of the error function at block 98, there is developed the history of the error function, as presented in FIGS. 2 and 3, which is stored in the memory 78.

At block 94, the error function is examined to determine if the present state of the spacecraft 20, in terms of its attitude and angular velocity, is downstream of the central region of the dead band. If this is not the case, the operation waits at block 96 for the spacecraft state to drift to the top end of the dead band of FIGS. 2 and 3. When the state of the spacecraft approaches the top end of the error band, at block 98 information is obtained from the memory 78 designating an initial duration of the pulse of the gas thruster 40. This information is applied via a closed switch 100 to block 102 wherein the thruster 40 is and is activated to produce a gas pulse having the desired duration.

The history of the error function, namely whether the graph of either FIG. 2 or FIG. 3 is approaching an edge region of the dead band or is within a central region of the dead band, is monitored at block 104. In the event that the error function is not confined in the dead band, the procedure passes to block 106 to provide for a waiting, during which time the operation continues with blocks 94, 98, 100 and 102 for operation of the thruster. When, at block 104, the state of the spacecraft is found to be within the dead band, the switch 100 is opened, and operation passes to block 105. At block 105, it is determined whether not the magnetic torquers 42 are in use.

In the event that the magnetic torquers 42 are not in use, the procedure advances to block 107 wherein the period of the graph of FIG. 2 is measured. Then, at block 108 there is a calculation of the optimum periodicity of the waveform of FIG. 2. The actual period at block 107 and the desired period at block 108 is compared at block 110 to determine the error in the periodicity. This error in periodicity is then employed, at block 112, to adjust the commanded pulse duration to a new value of pulse duration which is employed at block 102 in the activation of the thruster 40. At block 105, in the event that the magnetic torquers 42 are in use, operation proceeds to block 114 wherein, with reference to the graph of FIG. 2, observation is made of an error function, namely, the closest point of approach of the state of the spacecraft to the upstream edge (bottom edge in FIG. 2) of the dead band. In the event that the error shows that the graph is not reaching the upstream edge, then the gas pulse width of the thruster 40 is enlarged at block 116. In the event that, at block 114, it is observed that the spacecraft state is overshooting the upstream edge of the dead band, then at block 116 the commanded pulse duration is reduced. The required pulse width outputted at block 116 is applied to block 102 for activating the thruster 40 to operate with a reduced pulse width.

It is noted also that block 104 is always observing the history developed at block 92. Therefore, in the event that there is a sudden disruption in the operation of the spacecraft, which disruption sends the spacecraft attitude outside of the dead band, then the switch 100 is closed and operation resumes via blocks 94 and 98 as was described above.

Thereby, the system 58 is able to stabilize the attitude of the spacecraft 20 and to maintain the spacecraft attitude within a desired band, namely the dead band, centered on the desired attitude. In addition, the system 58 minimizes the number of opening and closure operations of the solenoid valve of the thruster 40 by allowing the spacecraft attitude to drift from the downstream edge of the dead band up to the vicinity of the upstream edge of the dead band, and back down to the downstream edge of the dead band before again activating the thruster 40. There follows now further details in the construction of preferred embodiments of the invention.

With reference also to FIG. 3, the control pulse size executed when the attitude exceeds the dead band value is adjusted according to the following schedule, based on a preceding measure of the excursion of the measured attitude. In the event that the effect of the first of a series of thruster pulses is to drive the maximum excursion of the measured attitude into only the first zone, then the duration of the next pulse is increased by 30 percent. In the event that the maximum excursion is observed to be in the second zone, then the next pulse width is increased by only 20 percent. In the event that the maximum excursion is observed to be in the third zone, then the next pulse width is increased 10 percent. In the event that the maximum excursion is observed to be in the fourth zone, then the duration of the next pulse is unchanged. This algorithm is symmetric and applies the same logic whether the attitude error be in the negative (downstream) side or in the positive (upstream) side of the dead band. In the event that the attitude traverses the dead band, going from the positive side to the negative side of the band, a reverse single control impulse is generated at a pulse width decreased 30 percent from the width of the previous pulse.

Figure 6:
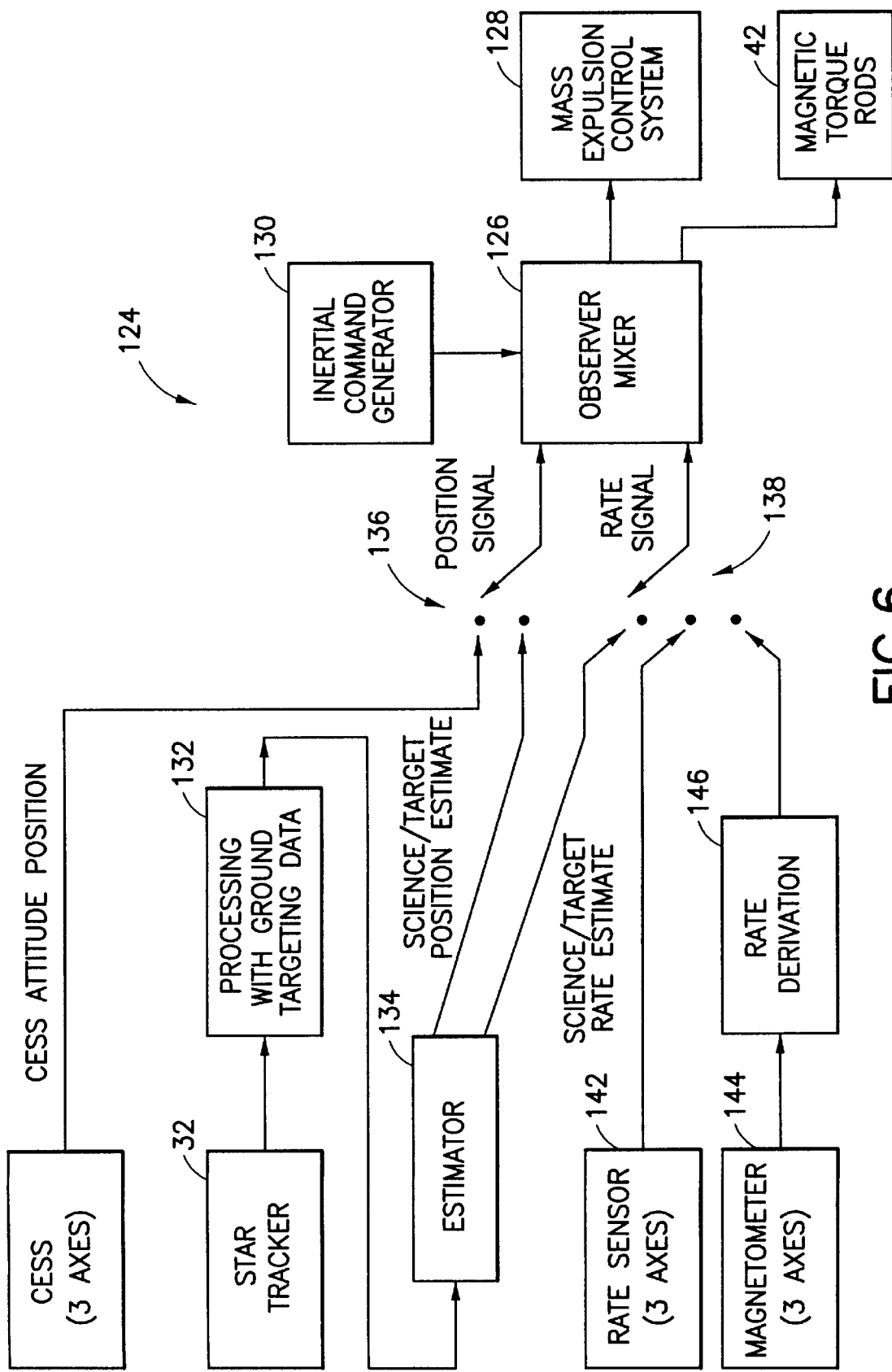
FIG. 6 is a diagram showing an inputting of attitude and angular rate signals to a mixer for use in a mass expulsion control systems.

FIG. 6 shows a simplified diagram of a control system 124 for control of the spacecraft. The system 124 includes an observer mixer of a 26 and a mass expulsion control system 128. Inertial commands are provided to the observer mixer 126 by a generator 130. The mixer 126 output signals to the control system 128, and also outputs control signals to the torque rods of the magnetic torquers 42. Input signals of the star tracker 32 may be processed with ground targeting data at block 132, and applied via an estimator 34 and switches 136 and 138 to the mixer 156. The estimator 134 obtains both position and rate information from the data of the star tracker 32. Position data may also be obtained from a three-axis earth sensor 140 which is applied via the switch 136 to the mixer 126. A rate sensor 142 may be employed to provide angle rate data via the switch 138 to the mixer 126. Also, a magnetometer 144 may be employed with a rate derivation unit 146 to provide angular rate via the switch 138 the mixer 126.

In operation, the observer mixer 126 performs the function of combining attitude position and rate signals from a plurality of sensor and/or data sources. The logic of this function then generates a composite position plus rate signal to the mass expulsion control system 128. During acquisition of the satellite attitude from an arbitrarily large attitude position and rate, a course attitude sensor (such as the magnetometer 144) may be used in conjunction with the rate sensor 142. The rate sensor 142 may be an inertial device or a signal processor of magnetic measurements. For control with a star tracker or fine sensor, estimator logic is used to filter the attitude signal and generate a rate signal. The information gathered by the mixer 126 is use for operation of the control system 128 and the magnetic torquers 42.

Figure 7:
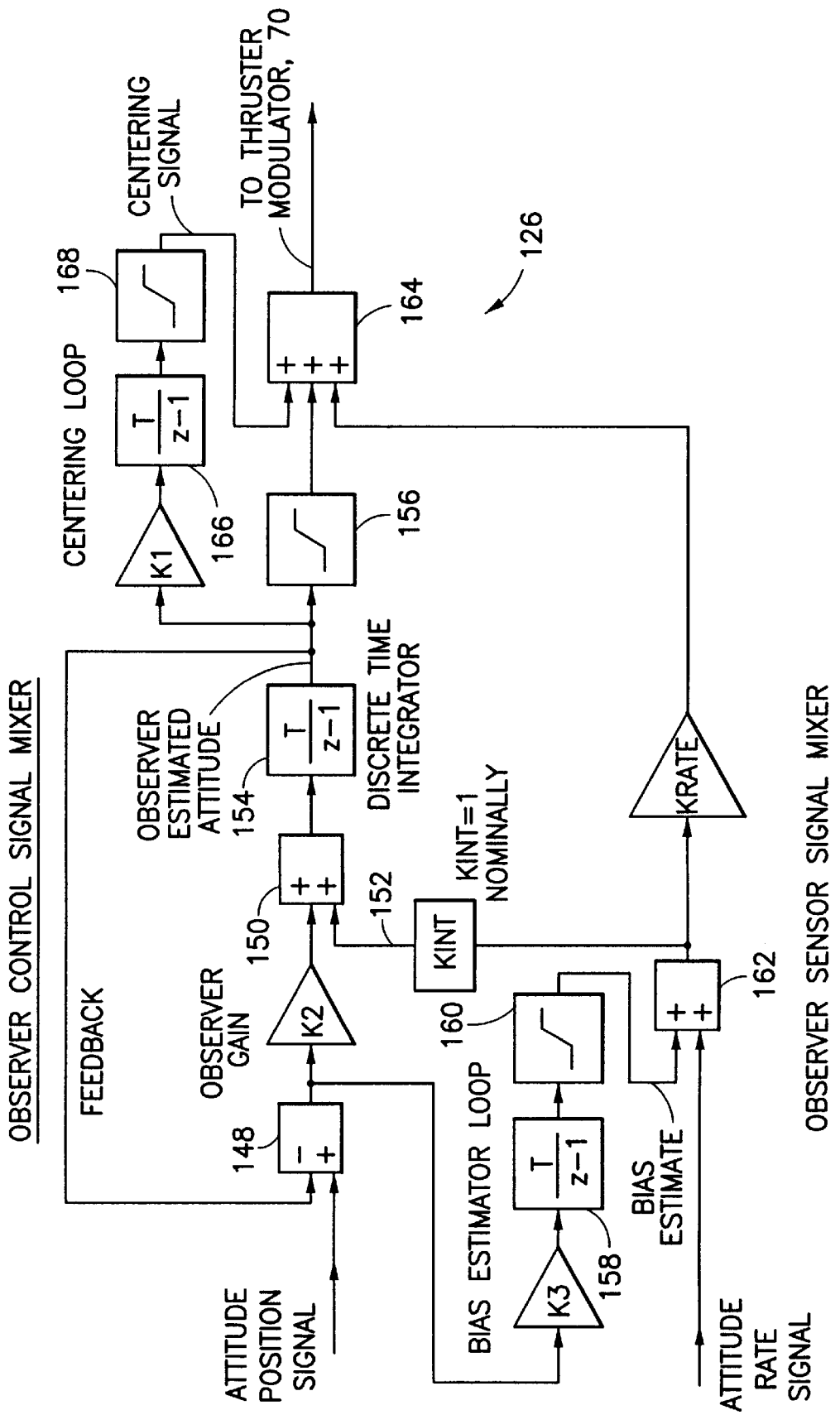
FIG. 7 is a diagram showing construction of the mixer of FIG. 6.

FIG. 7 shows details in the construction of the observer mixer 126. An attitude position signal and a feedback signal are applied to a summer 148, the output of which is applied via two signal channels to be multiplied, respectively, by gains K2 and K3. In the upper one of the two signal channels, the signal is combined at a summer 150 with a signal at line 152 obtained from the lower signal channel. The output signal of the summer 150 is applied via an integrator 154 to a threshold circuit 156. The output signal of the integrator 154 serves as the feedback signal for the summer 148. In the lower signal channel, the signal outputted by the summer 148 is applied via an integrator 158 to a threshold circuit 160. The output signal of the threshold circuit 160 is summed at 162 with an attitude rate signal from the switch 138 (FIG. 6). The output signal of the summer 162 is multiplied by a gain factor to provide the signal on line 152. The output signal of the summer 162 is multiplied by a further gain factor and is summed at a summer 164 with the output signal of the threshold circuit 156 the feedback signal is also applied as a feed-forward signal multiplied by a gain K1 via an integrator 166 to a threshold circuit 168. The output signal of the threshold circuit 168 is applied also to the input of the summer 164. The output signal of the summer 164 is provided as a command signal for operation of the modulator of the driver 70 (FIG. 4). The circuitry of FIG. 7 provides for the functions of the estimator 74 and the controller 64 (FIG. 4).

The circuitry of the observer mixer 126 provides logic functions which generate three signals of the control process. The composite position and rate signal constitutes an output signal which is provided to the thruster modulator at 70. An observer estimated attitude position signal, shown at the output of the integrator 154, is used to generate a centering signal, shown at the output of the threshold circuit 168. This provides an operating condition wherein an average attitude of the dead band is placed near null by addition of the centering signal. The gain K1 regulates the time constant of the centering process. A biased estimate is generated by integration of any long term offsets between the input attitude signal and the observer attitude estimate. The gain K3 regulates the time constant of the bias estimation. The gain K2 establishes the dynamic response balancing the integrated rate in the input attitude. The observer loop effectively filters potential signal noise from the input attitude signal.

Figure 8:
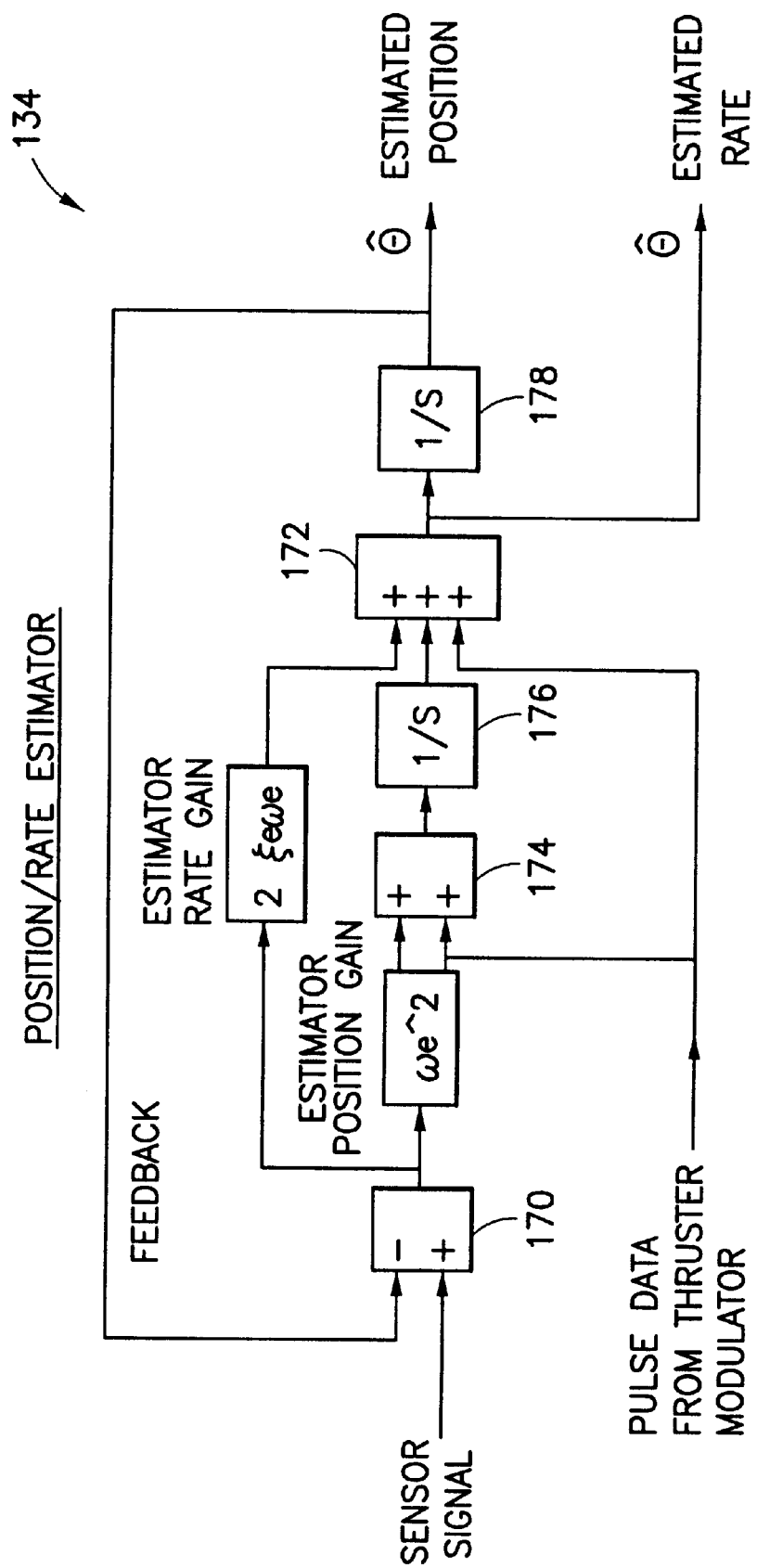
FIG. 8 is a block diagram showing construction of a position/rate estimator.

The block diagram of FIG. 8 shows details in the construction of the position/rate estimator 134 for use with the star tracker 32 providing fine attitude without need for a separate rate sensing. The sensor signal and a feedback signal are summed at a summer 170 to provide an output signal which is applied to a first signal channel and a feed forward channel. The estimator 134 includes a summer 172 which sums together signals of the first channel, the feed forward channel, and pulse data from the thruster modulator. The pulse data from the thruster modulator augments the estimator acceleration and rate signals. In the feed forward channel the angular rate portion of the sensor signal is multiplied by an estimator rate gain, and in the first channel, the position (attitude) portion of the sensor signal as multiplied by an estimator position gain. Different values of the gain at employed for the rate and for the position signals so that the contributions of these two components of the error are weighted approximately equally. The output signal of the position gain multiplier is summed at summer 174 with the pulse data from the thruster modulator. The output signal of a summer 174 is integrated at 176 to serve as an output signal of the first channel, this output signal being one of the aforementioned inputs to the summer 172. The output signal of the summer 172 is integrated at 178 to provide an estimate of the spacecraft position, this estimate serving also as the feedback signal applied to the summer 170. The output signal of the summer 172 serves as an estimate of the angular rate of the spacecraft.

Thus, is recognized that the logic functions provided within the estimator 134 provide for the a second order filter dynamics wherein the output has a component of position and a component of smoothed angular rate. The inputted control torque pulse signals from the thruster modulator provide timely pulse data which improves performance of the system when the star tracker has significant time delays.

Figure 9:
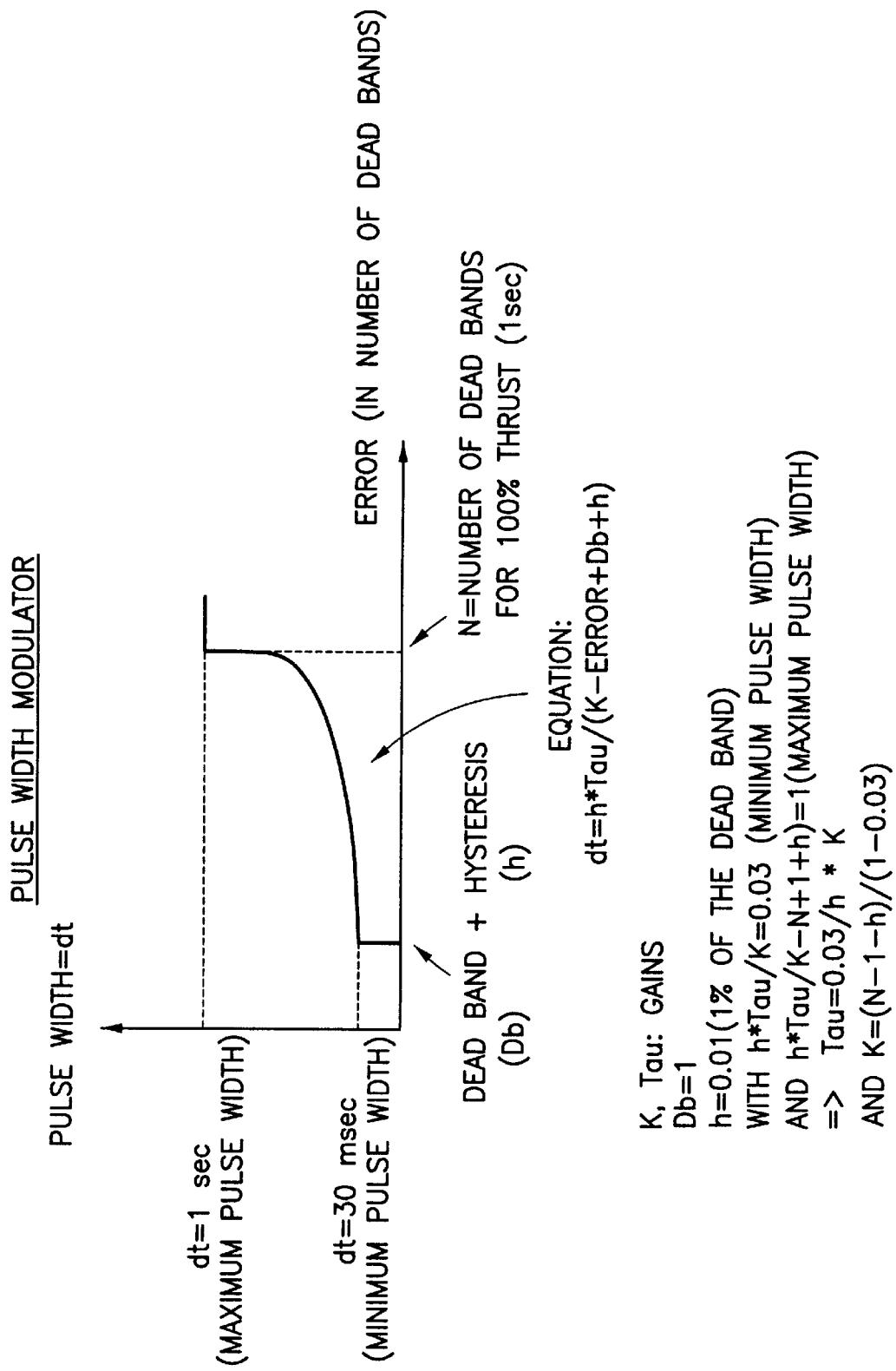
FIG. 9 is a graphical representation of operation of a pulse width modulation of form modulation of a thruster pulse.

FIG. 9 presents a graph providing details in the process of modulating the width of the gas pulse provided by the thruster 40. The pulse width is presented on the vertical axis, and is shown as a function of error input signal in the graph. The independent variable, or conditions, upon which the pulse width is based is presented on the horizontal axis. It is noted that the conditions set forth on the horizontal axis include a dead band plus hysteresis, during which condition the minimum pulse width is employed. As may be appreciated from examination of FIG. 2, a minimum pulse width permits operation with a minimum size of dead band because a single pulse at the minimum width is capable of driving the spacecraft attitude across approximately, but less than, the entire dead band, after which the attitude is allowed to drift back to the top edge of the band. In the acquisition phase wherein the attitude may be way beyond the confines of the dead band, it is necessary for the thruster to generate much larger impulses, this being indicated in FIG. 9 by the condition at the right end of the horizontal axis wherein an individual pulse is wide enough to drive the spacecraft attitude through a displacement equal to many dead bands. As a feature of the invention, is noted that optimum control avoids use of extra wide impulses for the condition wherein the attitude may be slightly outside of the confines of dead band. However, the amount of required pulse width increases much more rapidly for large excursions of attitude away from the dead band. This gives rise to the curved graph shown in FIG. 9.

The thrusters are to be operated in a pulse mode at a sample rate nominally about one second, but other rates can be used. The minimum duration pulse is generated when the attitude error signal exceeds the preset dead band threshold parameter. This pulse is generated at the beginning of the computation sample time. The impulse duration increases monotonically for error signal larger than the dead band according to a predetermined analytic function to a level of 100% duty cycle when the pulse duration is equal to the sample time. The minimum pulse is a set parameter, and has the above-noted value of approximately 0.03 seconds corresponding to the minimum realizable impulse that can be expended by the thruster equipment. A mathematical representation of the functional relationship is disclosed beneath the graph in FIG. 9.

Figure 10:
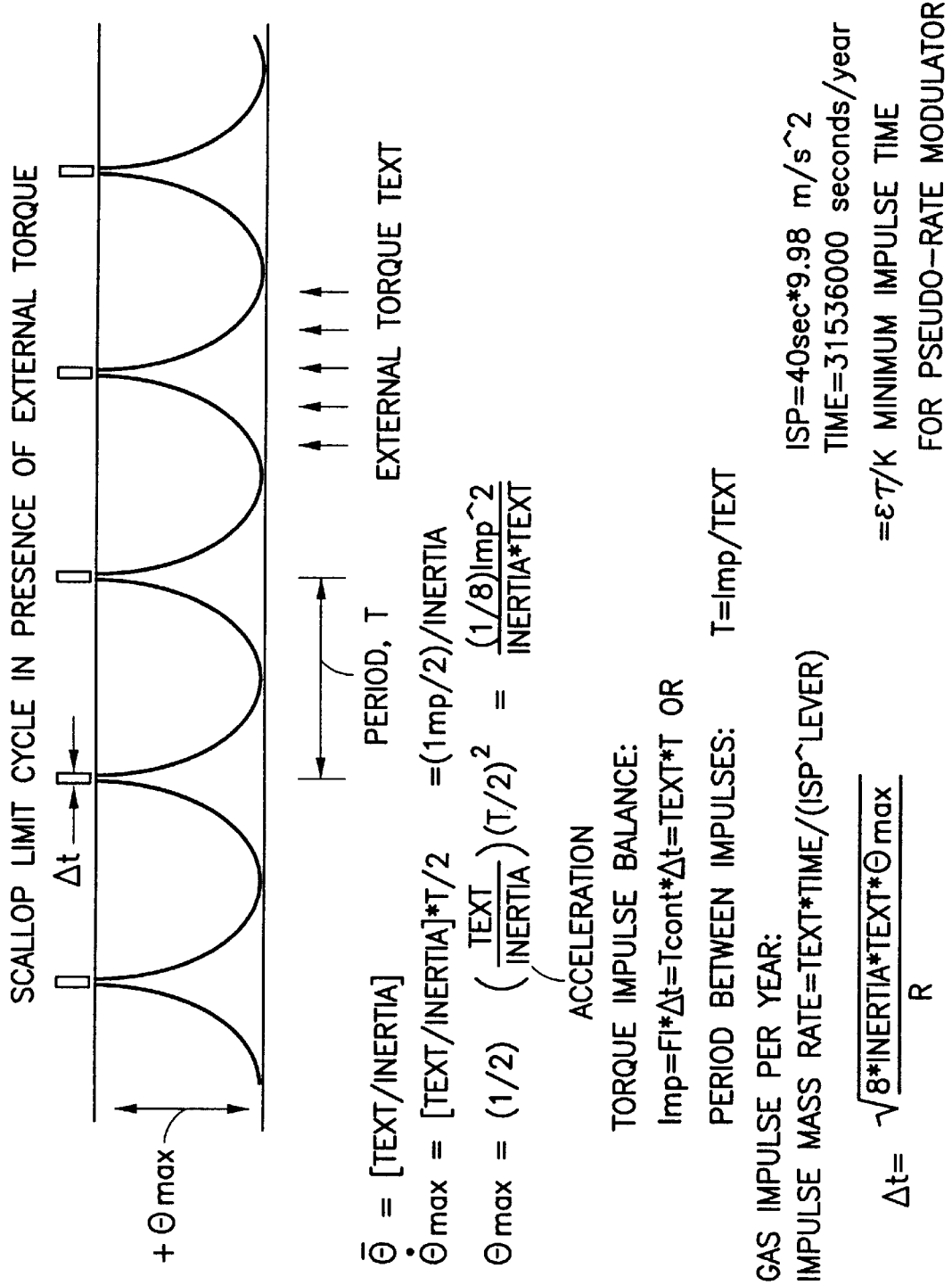
FIG. 10 is a graph similar to that of FIG. 2, but including mathematical description of the graph.

FIG. 10 presents the graph, previously shown in FIG. 2, along with a mathematical description of the functional relationship disclosed in the graph. In the mathematical relationships, the terminology is explained in the figure. For example, Text is the external torque produced by the earth's gravitational field. Inertia refers to the inertia of the spacecraft. Imp refers to the impulse of the thruster. The mass rate refers to the rate of emission of the gas particles from the thruster. It is noted also that there are two forms of modulation taking place, namely, the width of the pulse emitted by the thruster, and a modulation in the positions of the pulses in a sequence of the pulses. This is referred to in FIG. 10 as a pseudo-rate modulator.

Also represented in FIG. 10 is the concept of an averaging of the torque provided by a firing of the thruster. For a given size control impulse, the frequency of pulses (pulse repetition frequency) and the magnitude of the scallop is dependent on the external torque produced by the earth's gravitational field. It is desirable to increase the impulse size to minimize the pulse repetition frequency subject to the constraint that the scallop excursion is within the allowable dead band zone. The torque averaging is employed for each of the three attitude component channels, and would be used normally in a steady state, non-maneuvering part of the spacecraft mission. The graphical presentation in FIG. 10 is for the operation of each attitude channel in the presence of a nearly steady torque disturbance. The characteristics of the scallop limit cycles are determined as a function of the impulse time, force level, and lever arm (the perpendicular distance to a thruster line of fire from the center of mass of the spacecraft), the torque distribution magnitude, and the magnitude of the attitude excursion and the spacecraft inertia.

Figure 11:
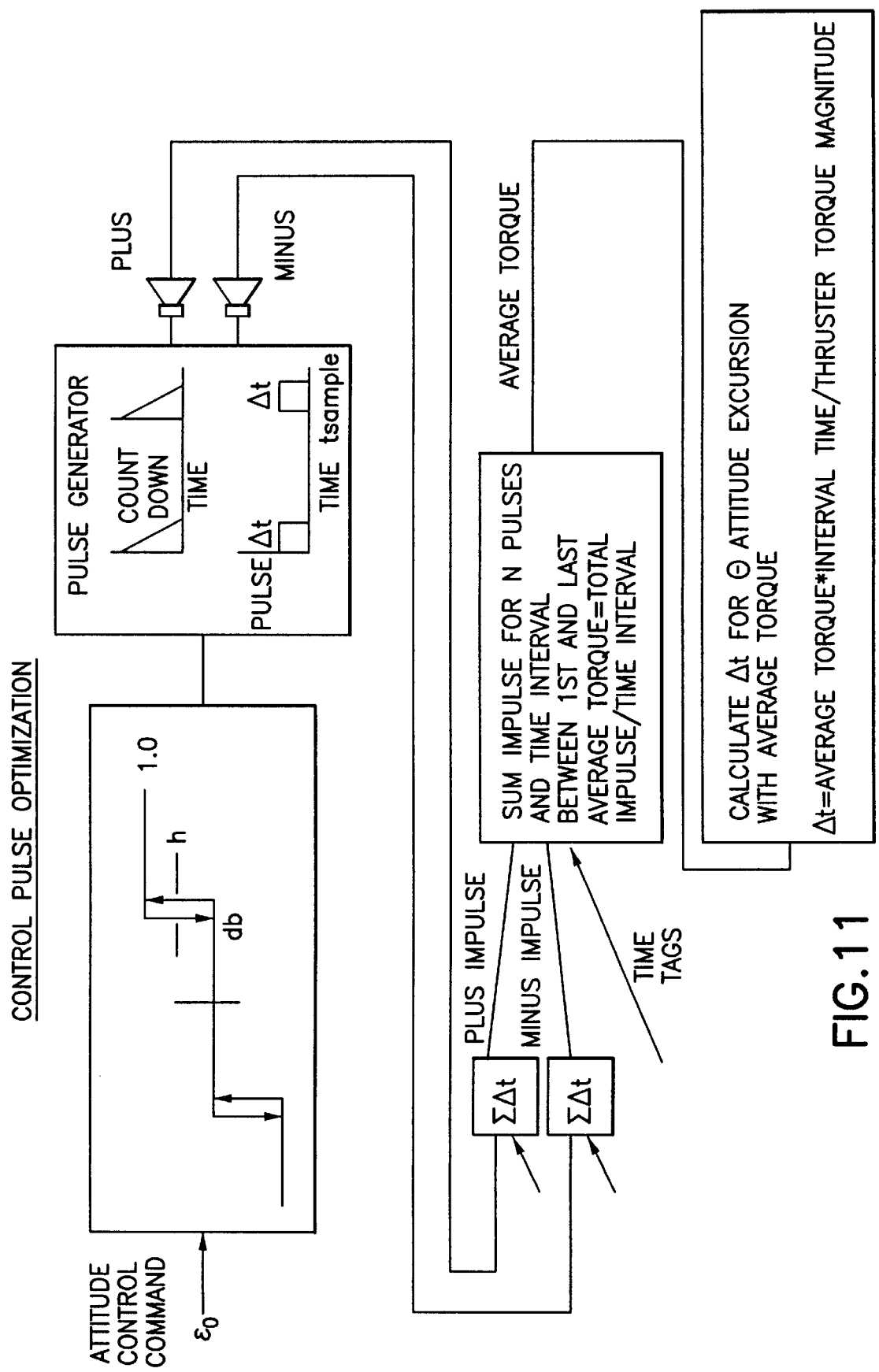
FIG. 11 shows a method of averaging torque.

In FIG. 11, the diagram shows operation of the control system in a measuring of the average external torque, this being accomplished by an averaging of a number of impulses over a time interval. This average torque can then be used to calculate a new impulse duration corresponding to an allowable attitude excursion within the modulator system dead band zone. The logic flow for adapting the impulse time is shown in FIG. 11. The error estimate $\epsilon$ is used to drive the system as the attitude control command, and is presented at the upper left portion of the figure. The response of the system includes a hysteresis of width h for both positive and negative values of the error estimate, the hysteresis enabling the spacecraft to drift prior to a firing of the thruster. This also presents a time interval which can be measured, the interval being shown in FIG. 2 as the interval between successive ones of the thruster pulses. In the pulse generator block, a countdown time is provided during the duration of a thruster pulse, which countdown time may show a decrementing or incrementing in the counting time, this being shown as plus or minus outputs from the pulse generator block. The time intervals are then summed to provide a measure of the average torque.

Figure 12:
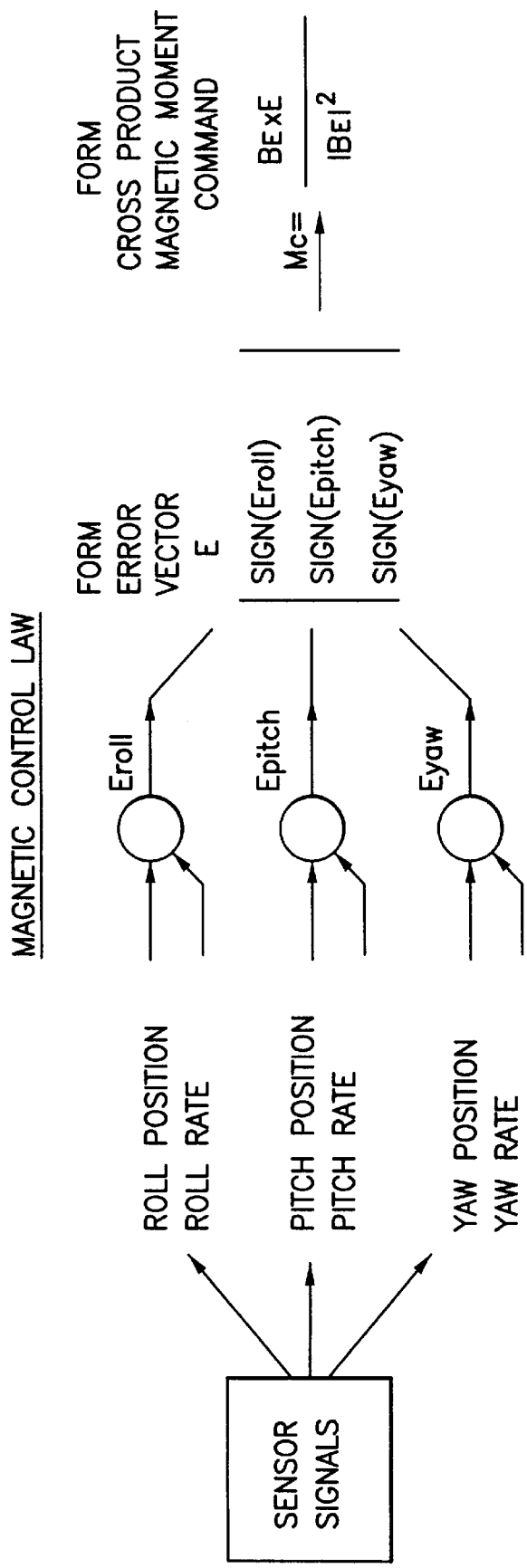
FIG. 12 shows development of the torque of a magnetic torquer.

With respect to FIG. 12, the use of magnetic torque rods, as has been disclosed above, can reduce the effects of the external gravitational torque and further reduce the requirement on mass expulsion by the thruster. Magnetic torques can be generated only in a plane normal to the local earth's magnetic field. It is possible to form the component of any desired torque that is in that plane. As shown in FIG. 12, a vector cross product of a desired torque with the local field vector is a magnetic moment command that, when acting with that same field vector, produces the torque component in the normal plane. In the case of a near polar orbit, pitch torques are readily available since the pitch axis in that case is always nearly normal to the field vector throughout the entire orbit. The control capability in roll and yaw are much more marginal in a polar orbit of the spacecraft.

A representative magnetic control relationship for control of the spacecraft is shown in FIG. 12. Sensor signals of position and rate for the three control axes are used to form an error vector E. The vector E has the desired direction of the control torque, this direction being at right angles to the local magnetic field. This error vector is used to form a magnetic moment command Mc for current in the magnetic thrusters, the magnetic moment command Mc being obtained from the normalized cross product with the field vector $B_E$. The vector $B_E$ is the earth's magnetic field intensity. The control torque is generated upon distribution of the magnetic moment command to the spacecraft array of three orthogonal magnetic torque rods.

Figure 13:
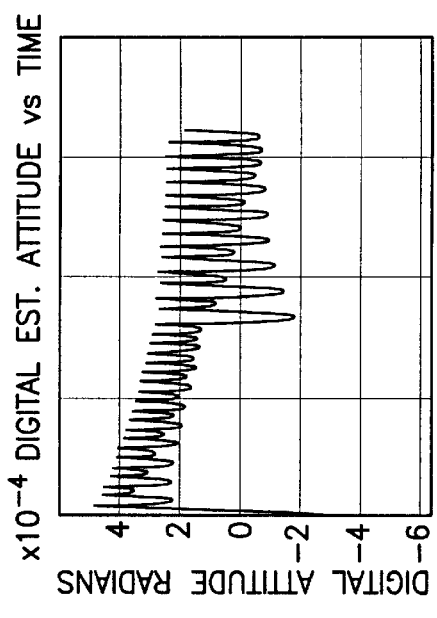
FIGS. 13–20 present way follows of dynamic response of a spacecraft to the attitude correction system of the invention.
Figure 14:
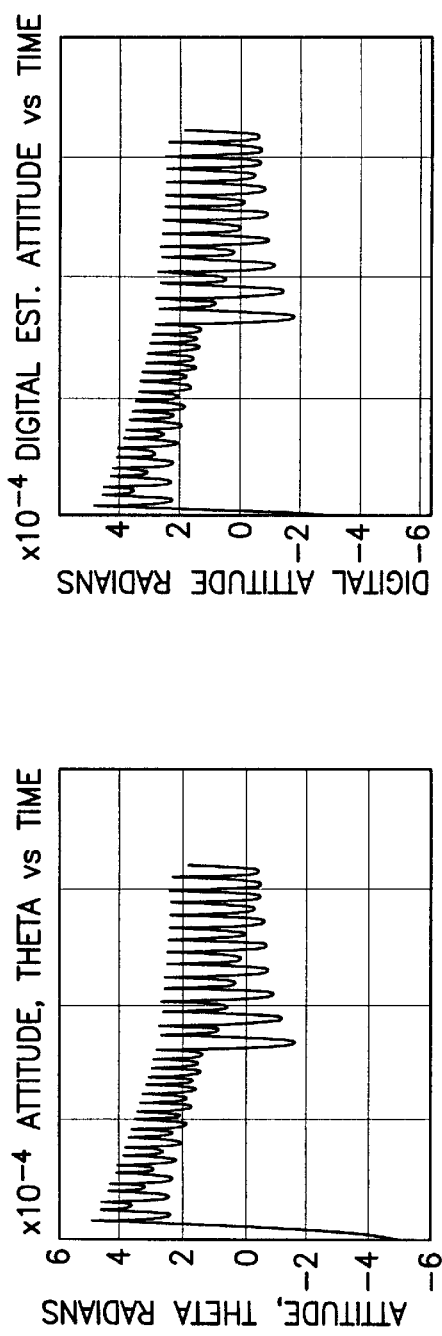
Figure 15:
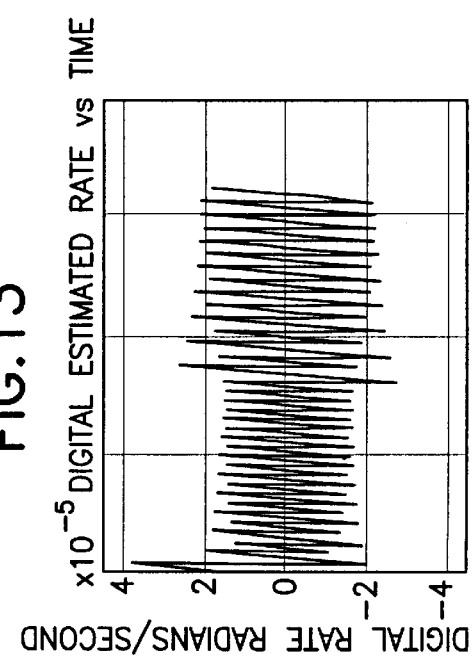
Figure 16:
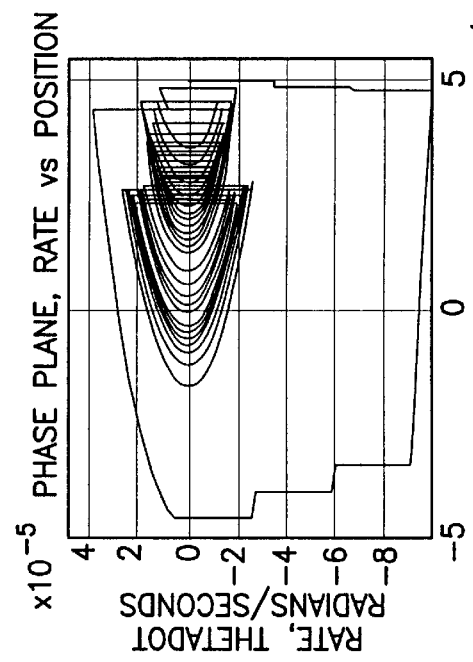
Figure 18:
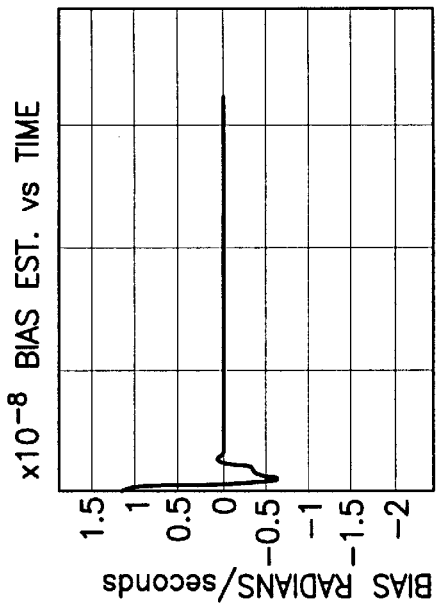
Figure 20:
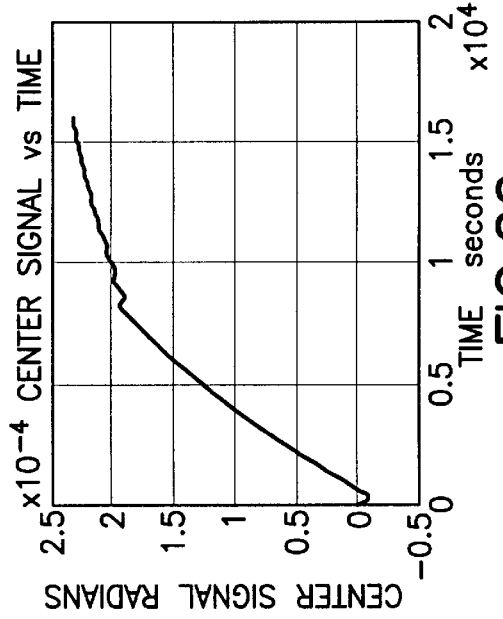
Figure 17:
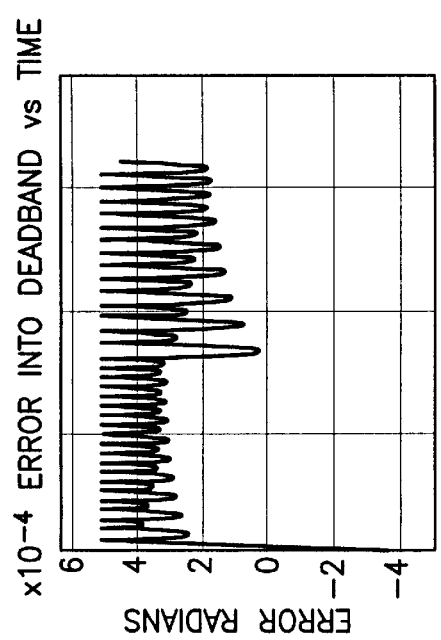
Figure 19:
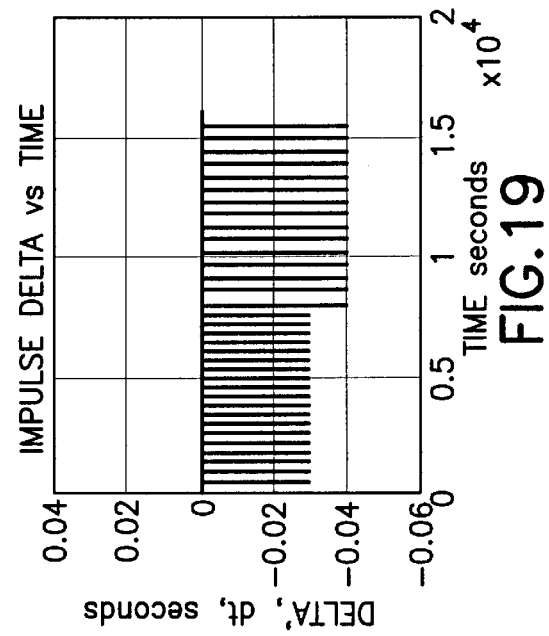

FIGS. 13–20 show performance from a single axis simulation of the system dynamics and control. This simulation employs the star tracker and provides attitude data through the estimation filter with inertial rate sensor providing rate information for the first 1,000 seconds of performance. After that time, with the spacecraft stabilized within an attitude dead band, the rate information source is switched to provide both attitude and rate coming from the estimation filter. This condition continues to 8,000 seconds with the minimum gas jet impulse size restricted to 30 milliseconds. After 8,000 seconds, the torque averaging logic regulates the impulse size to reduce the frequency of pulse incidence. More specifically, FIG. 13 shows attitude from star sensor versus time. FIG. 14 shows attitude from estimation filter versus time. In FIG. 15 shows attitude rate from estimation filter versus time. FIG. 16 shows phase plane of the spacecraft rate versus star sensor attitude. FIG. 17 shows error signal to the dead band comprising combination of attitude and rate signals versus time. FIG. 18 shows control impulse duration versus time. FIG. 19 shows bias estimate versus time wherein bias is nominally zero. FIG. 20 shows centering signal versus time wherein the average value of the attitude is approaching zero.

Figure 21:
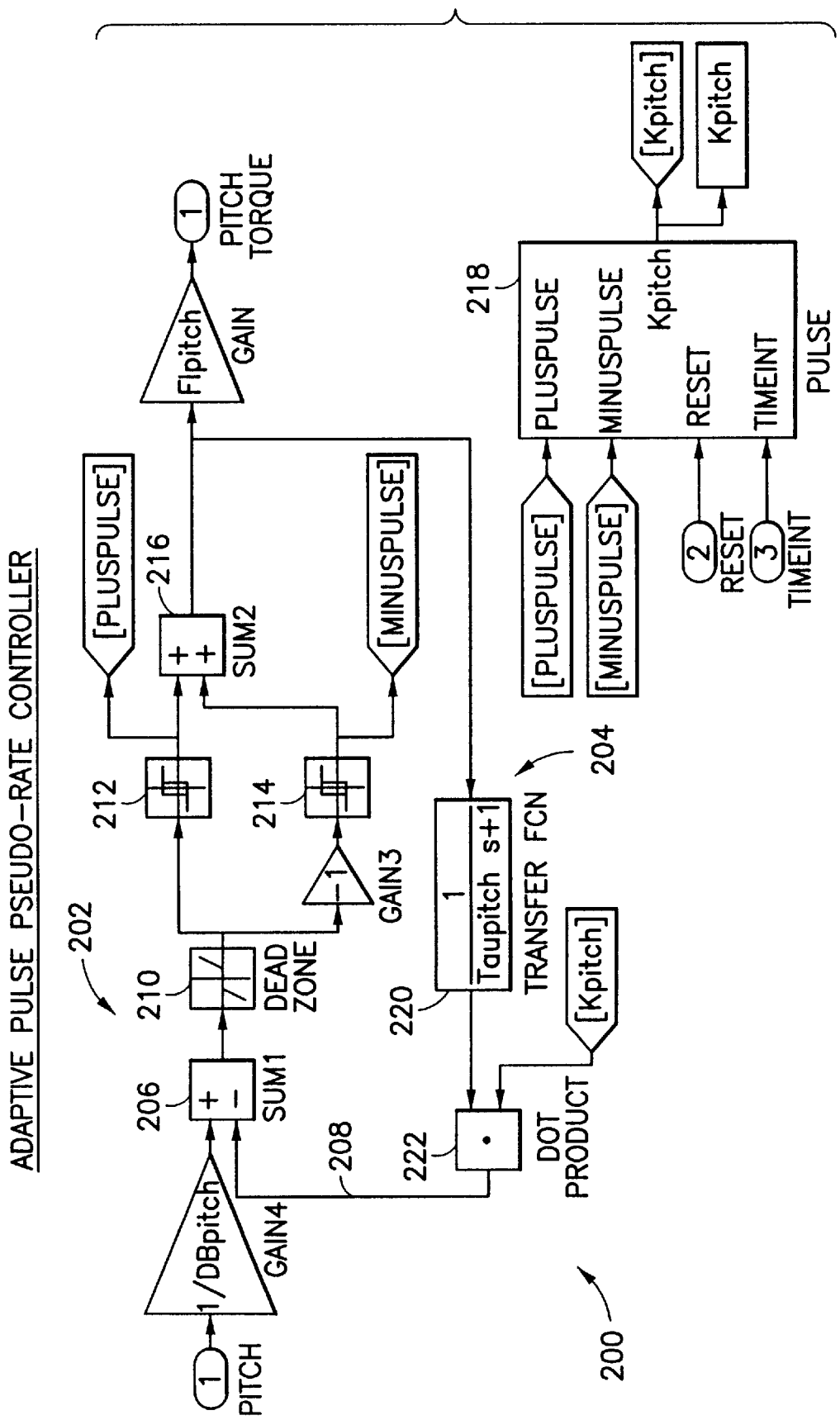
FIGS. 21 and 22 present a diagram explaining operation of the system of the invention.
Figure 22:
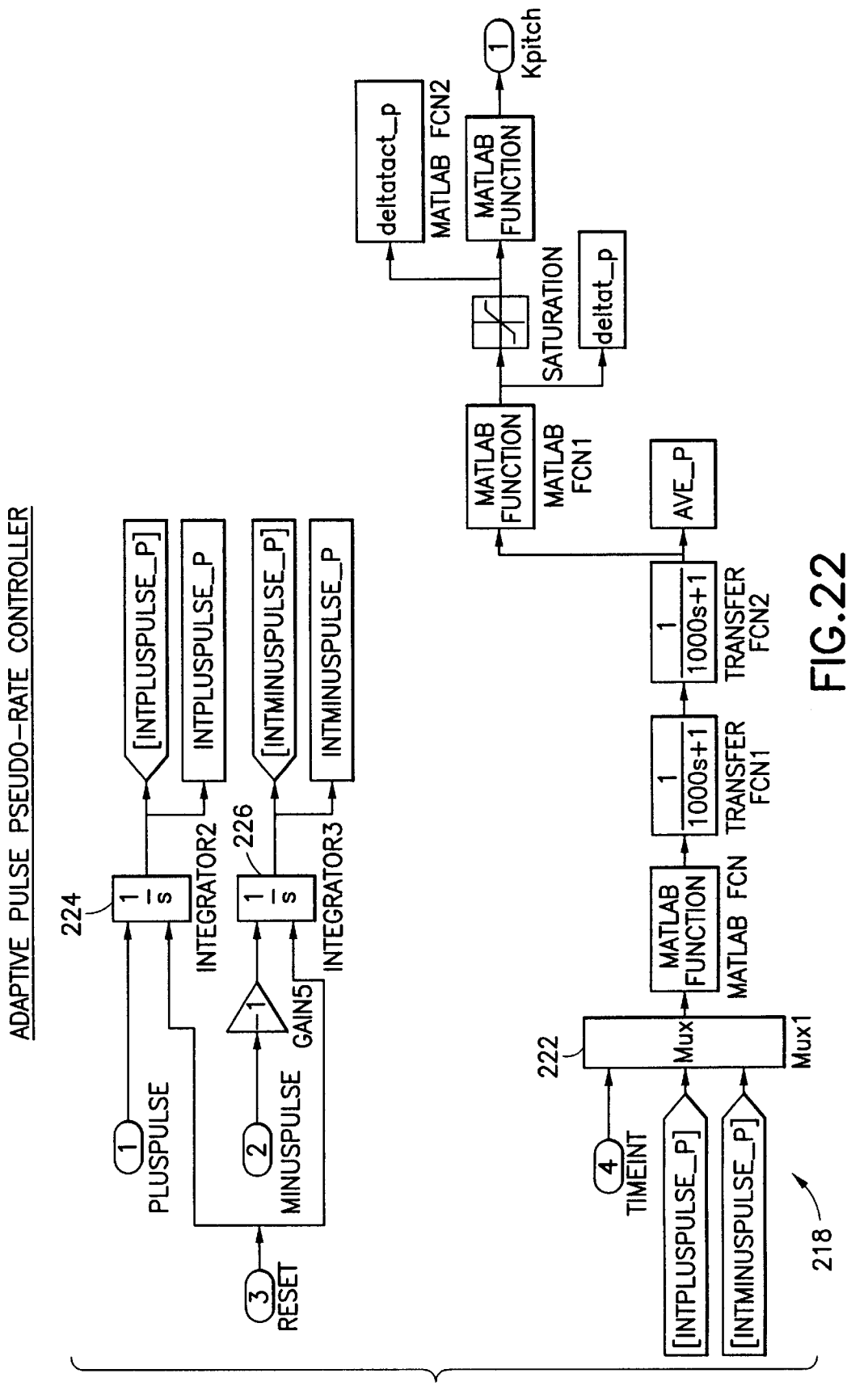

FIGS. 21 and 22 show incorporation of the dead zone and hysteresis within the control loop of the system. In the operation of a control system of the invention, as represented by the system 200 of FIGS. 21 and 22, there is a forward branch 202 and a feedback branch 204. In the forward branch 202, the pitch signal, measured in decibels, is summed at a first summer 206 with the feedback signal at line 208, and applied to a dead zone functional block 210. As evidenced by the graph shown within the functional block 210, relatively small values of pitch, presented on the horizontal axis of the graph, produce no output signal, presented on the vertical axis of the graph, from the functional block 210. The output signal of the functional block 210 is split into two channels of differing gain, wherein both of the channel signals are applied through hysteresis circuits 212 and 214. Output signals of the hysteresis circuits 212 and 214, summed at a second summer 216 to output a desired torque for the pitch components of the signal. While the foregoing description applies to the pitch signal, it is understood that corresponding circuits are employed for the roll and yaw components of the spacecraft attitude. The output signals of the hysteresis circuits 212 and 214 also serve, respectively, as plus pulse signal and minus pulse signal, the signal being applied to a pulse generator 218.

The feedback branch 204 connection between the output terminal of the second summer 216 and an input terminal of the first summer 206. The output signal of the second summer 216 is applied to a torque-pitch transfer function at block 220, and then is multiplied at multiplier 222 with a pitch parameter outputted by the pulse generator 218. The output signal of the multiplier 222 is and applied via the line 208 to the summer 206.

As shown in FIG. 22, the pulse generator 218 comprises two integrators 224 and 226, wherein a reset signal is employed for resetting the integrators 224 and 226 to a specific reset value. The plus pulse of FIG. 21 is applied to an input terminal of the integrator 224, and the minus pulse of FIG. 21 is applied to an input terminal of the integrator 226. The integrators 224 and 226 provide integration of the plus pulse and of the minus pulse respectively. The integrated plus and minus pulses are applied to a multiplexer 228 along with a time integration signal. The output of the multiplexer 228 is applied via a series of functional blocks to produce the pitch parameter inputted, in FIG. 21, to the multiplier 222. It is noted that the functional blocks include integration filters and a saturation function which maximizes a value of the pitch parameter as a function of the forward branch signal (branch 202) of FIG. 21.

Thereby, the system of the invention is able to provide for a smooth consistent control of the spacecraft attitude while minimizing the number of closure and opening operations of the thruster solenoid valve. The objective of the invention is accomplished by allowing the spacecraft to drift within a band of acceptable attitude including the desired attitude and, wherein, enlargement of the band permits the thruster to be operated with longer and fewer pulses.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An attitude control system operative with a thruster for controlling attitude of a vehicle carrying the thruster, wherein the thruster comprises a valve enabling the formation of pulses of expelled gas from a source of compressed gas, the system comprising:

means for gathering data of the attitude of the vehicle, wherein the vehicle is located within a force field tending to orient the vehicle in a first attitude;

means for driving the thruster to expel a succession of pulses of gas, wherein an individual one of the pulses of gas provides a force impulse which urges the vehicle toward a desired attitude different from the first attitude, the force field causing the vehicle to drift back towards the first attitude during an interval of time between successive ones of the gas pulses;

means for evaluating the attitude data to determine a pattern of values of attitude of the vehicle in response to the gas pulses and in response to the force field, the control system being operative to maintain the attitude within a predetermined band of values of attitude which includes the desired attitude;

means for determining if said pattern is within bounds of said band;

means for establishing an optimal duration of each of the gas pulses based on the pattern of values of attitude, the optimal duration providing for a minimal number of opening and closure operations of the valve; and wherein the establishing means communicates the optimal duration to the driving means for driving the thruster to provide a gas pulse with the optimal duration; and said establishing means, in response to a determination from said determining means, is operative to adjust the pulse duration dependent on a periodicity of said pattern when said pattern is confined within said band, and is operative to adjust the pulse duration dependent on a closest point of approach of said pattern to a boundary of said band when said pattern is confined within said band and upon an occurrence of generation of torque on said vehicle by a source of torque.

2. A system according to claim 1 wherein said establishing means is operative to measure a periodicity of said pattern of attitude values, the periodicity varying as a function of duration of an individual one of said force impulses such that an increase in pulse duration results in an increase in a period of said pattern, and wherein said establishing means is operative further to select a largest value of pulse duration for which said pattern remains bounded within edges of said band of attitude values.

3. A system according to claim 1 wherein said establishing means is operative to measure a succession of values of attitude subsequent to initiation of one of said gas pulses, a maximum excursion of attitude values from one edge of the band of attitude values towards the opposite edge of the band of attitude values increasing with duration of an individual one of said gas pulses; and wherein said establishing means is operative further to select a largest value of pulse duration for which said succession of values of attitude remains bounded within edges of said band of attitude values.

4. A system according to claim 1 wherein said establishing means, in response to the determination from said determining means, is operative to select a previously stored value of pulse duration dependent on downstream value of said attitude when said attitude is outside said band.

5. A system according to claim 4 wherein said source of torque is a magnetic torquer.

6. A method of controlling attitude of a vehicle carrying a thruster, wherein the thruster comprises a valve enabling the formation of pulses of expelled gas from a source of compressed gas, the method comprising steps of:

gathering data of the attitude of the vehicle, wherein the vehicle is located within a force field tending to orient the vehicle in a first attitude;

driving the thruster to expel a succession of pulses of gas, wherein each pulse of gas provides a force impulse which urges the vehicle toward a desired attitude different from the first attitude, the force field causing the vehicle to drift back towards the first attitude during an interval of time between successive ones of the gas pulses;

evaluating the attitude data to determine a pattern of values of attitude of the vehicle in response to the gas pulses and in response to the force field, the method serving to maintain the attitude within a predetermined band of values of attitude which includes the desired attitude;

determining if said pattern is within bounds of said band;

establishing an optimal duration of each of the gas pulses based on the pattern of values of attitude, the optimal duration providing for a minimal number of opening and closure operations of the valve; and wherein, in said driving step, providing individual ones of the gas pulses with the optimal duration; and within said establishing step, in response to a determination from said determining step, adjusting the pulse duration dependent on a periodicity of said pattern when said pattern is confined within said band, and adjusting the pulse duration dependent on a closest point of approach of said pattern to a boundary of said band when said pattern is confined within said band and upon an occurrence of generation of torque on said vehicle by a source of torque.

7. A method according to claim 6 wherein said establishing step includes steps of measuring a periodicity of said pattern of attitude values, wherein the periodicity varies as a function of duration of an individual one of said force impulses such that an increase in pulse duration results in an increase in a period of said pattern; and selecting a largest value of pulse duration for which said pattern remains bounded within edges of said band of attitude values.

8. A method according to claim 6 wherein said establishing step includes steps or measuring a succession of values of attitude subsequent to initiation of one of said gas pulses, a maximum excursion of attitude values from one edge of the band of attitude values towards the opposite edge of the band of attitude values increasing with duration of an individual one of said gas pulses; and selecting a largest value of pulse duration for which said pattern remains bounded within edges of said band of attitude values.

9. A method according to claim 6 wherein, in said establishing step, in response to the determination from said determining step, selecting a previously stored value of pulse duration dependent on downstream value of said attitude when said attitude is outside said band.

10. A method according to claim 9 wherein said source of torque is a magnetic torquer.

* * * * *